(12) United States Patent
Mannone

(10) Patent No.: US 11,325,659 B2
(45) Date of Patent: *May 10, 2022

(54) TRANSPORT SYSTEM AND TRANSPORTABLE STORAGE CONTAINER FOR A VEHICLE BED

(71) Applicant: Richard K Mannone, Ocala, FL (US)

(72) Inventor: Richard K Mannone, Ocala, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/247,415

(22) Filed: Dec. 10, 2020

(65) Prior Publication Data

US 2022/0009562 A1 Jan. 13, 2022

Related U.S. Application Data

(63) Continuation-in-part of application No. 16/924,715, filed on Jul. 9, 2020.

(51) Int. Cl.
*B62D 33/02* (2006.01)
*B60R 9/06* (2006.01)
*B60R 11/00* (2006.01)

(52) U.S. Cl.
CPC ............ *B62D 33/0207* (2013.01); *B60R 9/06* (2013.01); *B60R 2011/0084* (2013.01); *B60R 2011/0092* (2013.01)

(58) Field of Classification Search
CPC ..... B60R 2011/0084; B60R 2011/0092; B60R 9/065; B60R 11/06
USPC ......................................... 224/404; 296/37.6
See application file for complete search history.

(56) References Cited

U.S. PATENT DOCUMENTS

| 5,308,133 | A | 5/1994 | Mangum et al. |
| 5,584,521 | A | 12/1996 | Hathaway et al. |
| 5,642,971 | A | 7/1997 | Ragsdale |
| 5,988,722 | A | 11/1999 | Parri |
| 6,155,625 | A | 12/2000 | Felix |
| 6,422,627 | B1 | 7/2002 | Kuhn et al. |
| 6,464,277 | B2 * | 10/2002 | Wilding ................... B60R 9/00 224/404 |
| 6,533,337 | B1 | 3/2003 | Harshman et al. |
| 8,376,438 | B1 * | 2/2013 | Johnson, Sr. ........... B60R 5/044 296/37.6 |
| 8,814,246 | B2 | 8/2014 | Weller |
| 2002/0140245 | A1 * | 10/2002 | Coleman, II .............. B60R 5/04 296/26.09 |
| 2003/0011207 | A1 | 1/2003 | Campbell |
| 2005/0118006 | A1 | 6/2005 | Studer |
| 2009/0071991 | A1 | 3/2009 | Evans |
| 2016/0167718 | A1 | 6/2016 | Wilson |
| 2017/0166264 | A1 | 6/2017 | Puchkoff |
| 2019/0106160 | A1 | 4/2019 | Roberts |

* cited by examiner

*Primary Examiner* — Justin M Larson
(74) *Attorney, Agent, or Firm* — Stonebridge IP, PLLC

(57) ABSTRACT

The present disclosure is directed to a cargo moving system for moving storage units from the front of a truck bed to the rear and back again. The disclosed product is made of two components, a rail system, and a customizable storage unit. In a pickup truck embodiment, the rail system sits on top of vertical rails disposed on or in a pickup truck bed that can run from the cab to the tailgate. A storage unit sits on the rails or tracks and is moved by a motorized or manual transport system.

10 Claims, 8 Drawing Sheets

TRANSPORT SYSTEM AND TRANSPORTABLE STORAGE CONTAINER FOR A VEHICLE BED

CROSS REFERENCE TO RELATED APPLICATIONS

This application is a continuation in part under 35 USC § 120 of U.S. application Ser. No. 16/924,715 filed on Jul. 9, 2020, the entire contents of which is incorporated herein by reference in its entirety.

BACKGROUND OF THE DISCLOSURE

Field of the Invention

This disclosure generally relates to storage containers for vehicles and more particularly to onboard, movable, storage containers for trucks including pickup trucks.

Description of the Related Art

Currently, commercial and passenger pickup truck owners do not have the ability to access items stored in cargo units of a truck without having to climb into the bed of the truck. Also, for large commercial vehicles there is no way to easily move cargo in and out without the use of a forklift, pallet jack, or physically climbing into the truck. Accordingly, the ability to fully utilize a pickup truck's storage capability is limited. Furthermore, there is a significant chance of injury when an individual climbs in and out of the bed of a truck.

There is also need for users with existing storage units to retrofit their vehicles and enjoy the ability of moving their cargo from the front towards the rear of the vehicle and back again intermittently using a motorized rail system without having to climb into the vehicle. For large commercial vehicles, there is also a need for moving and transporting cargo efficiently and without damaging the cargo.

There are a large number of pickup trucks in use, but pickup trucks do not provide a location, other than in the cab, to place items where they will not be subjected to the weather. This especially creates a problem when passengers would like to utilize the back seat, and there is no back seat space available because it is being used for storage. In other cases, there may be a need to store items that are not suitable to be stored in the cab of a truck. The only conventional option to address these issues has been to purchase an SUV (instead of a pickup truck) or purchase a topper for pickup truck bed.

There is accordingly a need to address these types of storage problems, particularly for pickup trucks, and to make a pickup truck more convenient for storage.

SUMMARY OF THE INVENTION

The present disclosure is directed to a cargo moving system including moving storage units from the front of a truck bed to the rear (and back again). The disclosed product includes two components: a rail system and a customizable storage unit. In a pickup truck embodiment, the rail system sits on top of vertical rails disposed on or in a pickup truck bed and may run from the cab to the tailgate. A storage unit sits on the rails or tracks and is moved by a motorized or manual powered transport system.

The rail system allows one to take a storage box, or an existing toolbox, and attach them to the disclosed rail system and move the box from the cab end of a pickup bed to the tailgate end, or anywhere in between, and back.

This not only increases ease of use but it also makes using a storage box or toolbox, or the like, safer and easier as a user no longer needs to climb in and out of the truck bed to gain access to the contents of the storage box or toolbox.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
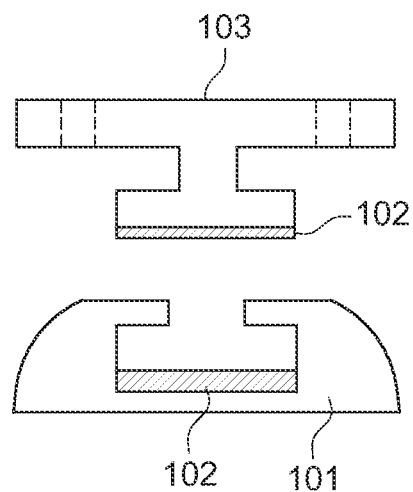
FIG. 1A shows an embodiment of a manual rail transport system of the disclosure.

The following detailed description is provided to assist the reader in gaining a comprehensive understanding of the methods, products, and/or systems, described herein. However, various changes, modifications, and equivalents of the methods, products, and/or systems described herein will be apparent to an ordinary skilled artisan.

A rail system is designed to move a storage box, or other types of toolbox, from the cab end of a truck to the tailgate end and back. It is also capable of being stopped and secured anywhere in between.

The rail system can be located either on the side rails of a truck, on the floor of a truck bed, and/or the sidewalls of a truck or trailer bed. The rail system may allow a user to release a locking mechanism and physically slide the box on the rail system either towards the cab or towards the tailgate and lock it in place wherever they choose. The rail system may be secured to a truck with a locking mechanism which also permits removal from the truck. The locking mechanism may require either a key or combination to open. At the tailgate end of the rail system there may also be a locking plate, which when removed allows the box to be removed from the rail system but leaves the rail system secured to the truck so the box can be placed back on the rail system whenever the user chooses.

A rail system may also be provided independent of a storage unit. The rail system may include modification plates to adapt a variety of storage units to the rail system. A motor of a motorized version of the rail system may provide transport on both sides of the tracks simultaneously and may be capable of moving cargo in the range of 0 to about 500 lbs.

The present disclosure provides rails which attach to the vertical sides or side panels of a bed or cargo area for large or small commercial vehicles including trucks or pickup trucks. The disclosure provides an independent, self-powered, motor to move storage units. The disclosure also provides a fully customizable storage unit.

As mentioned, the present disclosure also provides a rail system independent of a storage unit. The rail system may be provided on vertical rails of a pickup truck bed and may include adapter plates for use with a variety of storage units. The present disclosure also provides a rail system including a customizable storage unit included on the vertical rails. The rails may be installed horizontally in the cargo section of vehicle beds in single or stacked configurations. The number of rails is not specifically limited and there may be one rail, two rails, three rails, or even four or more rails in specific embodiments.

A motorized version is provided as well as a manual version. There are several transport methods capable of being used with the motorized version. They include, but are but not limited to, a worm screw, a chain or belt drive, an electric motor, a battery-operated motor, or a combination thereof.

Materials for manufacture depend on the intended use. Materials include aluminum, steel, or other metals, such as titanium, etc.

In embodiments, a rail system may utilize one or more polymer coated surfaces for transporting a storage box along a rail system. A rail system may include a storage box, a storage box connector, and one or more rails. The storage box connector connects a storage box to one or more rails. The storage box connector may include one or more surfaces that are polymer coated. The rail system may also contain one or more surfaces that are polymer coated as well. The storage box connector may thus be able to slide smoothly along the polymer-coated surfaces for transport along the rails. In embodiments, the polymer-coated surfaces may include Teflon™. The slidable rail system may permit a storage box to be moved the full length of a truck bed, for example, from the cab of a pickup truck to the tailgate end or any portion thereof.

In embodiments, a storage box connector may also include wheels configured to smoothly roll along a rail system for transport. The wheels may be made of any appropriate material including plastic and polymer materials, ceramics, metals, including stainless steel, and combinations thereof.

In embodiments, the rail transport system may also include a locking mechanism for locking a storage box at a particular position along a rail system. For example, a box with a locking mechanism may be attached to the tailgate end of a storage box connector with an adapter providing a locking mechanism for locking a storage box anywhere along a rail system.

In embodiments, the box locking mechanism may include a lever to engage or disengage a locking mechanism. As one example, the lever may engage a spring which pushes a gear plate against another gear plate disposed and attached along the side of a rail to permit locking a storage box in place at a particular position along a rail system. The lever may also disengage the spring and pull a gear plate away from a side gear plate permitting the storage box to be moved again.

A storage box as referred to herein, refers to a box, typically with a lid that is removable or configured to be opened and closed, appropriate in size for the bed of a truck. For example, if the bed of the truck is a pickup truck, the storage box may vary in size from about half the width of the pickup truck bed to the full width of the pickup truck bed, for example 2-4 feet. The height of the storage box may vary anywhere from about 1 foot to about 5 feet. The typical height may be about 2 feet to about 4 feet. The width may be between 1 foot to 5 feet, preferably 2 to 4 feet. The storage box may be made of a plastic material, a composite, metal, or combinations thereof.

A vehicle bed as referred to herein, generally refers to any truck bed which is used for holding the cargo of a truck and which can be open or enclosed. In embodiments, the vehicle bed refers to a pickup truck bed.

Rails as referred to herein, generally refers to a bar or structural member forming a track for a transport system. A movable or slidable structure, for example, wheels, can run in a depression in the rail or on the rail. The length of the rails may be approximately the length of a pick up truck bed in preferred embodiments. For example, the length of the rails may be about 4 feet to about 10 feet. IN other embodiments, the rails be about 5 to 8 feet long to fit standard pick up truck beds.

A storage box connector as referred to herein, generally refers to a base plate structure which can be connected or attached to a bottom of a storage container on one side and to a rail on another side. The storage box connector thus provides an interface between a storage container and a rail. A storage box connector, in embodiments, allows a storage box to be attached and removed from a particular rail system, thus allowing storage boxes to be interchanged with a particular rail system. The storage box connectors of the disclosure can be made of a variety of materials including plastics, composites, and metals in accord with the requirements of a particular rail system.

A mechanism for transporting a storage box along one or more rails is provided. In embodiments, the mechanism for transport is manually powered. For example, a storage box or storage box connector may slide along a rail or rails via a slidable surface including a polymer coating. For example, the polymer coating may include Teflon™. In other examples of a manually powered mechanism, the storage box or storage box connector may include wheels which are configured to run in or along the rails and allow movement of the storage box and storage box connector along the full or partial length of a truck bed.

A locking mechanism as referred to herein generally refers to any mechanism capable of locking a storage box or storage box connector at a particular position on a rail. The locking mechanism may include, for example, two plates with surface structures that when brought into surface contact interlock with each other. For example, the plates may be gear plates.

Figure 1B:
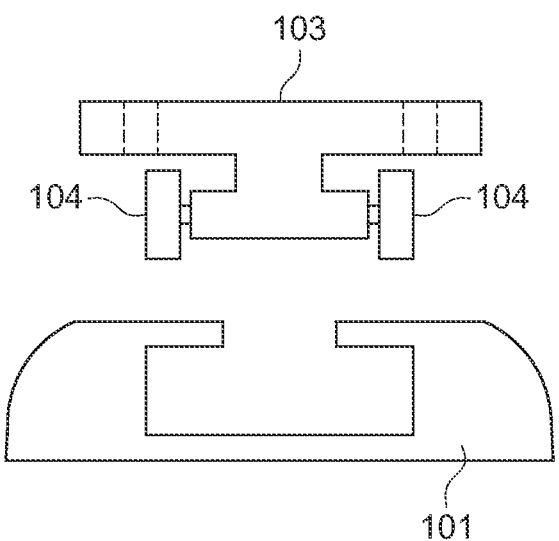
FIG. 1B shows another embodiment of a manual rail transport system of the disclosure.

FIG. 1A and FIG. 1B show two embodiments of a manual rail transport system of the disclosure.

In FIG. 1A, rail 101 includes polymer-coating 102. The polymer-coating could be, for example, Teflon™. Storage box connector 103 is dimensioned to fit into rail 101 and contains a polymer-coating 102 on one or more surfaces in contact with rail 101.

In FIG. 1B, rail 101 is dimensioned to hold storage box connector 103. In this case, storage box connector 103 includes wheels 104. Storage box connector 103 is dimensioned to fit within rail 101 and is configured to transport along rail 101 via wheels 104.

Figure 2:
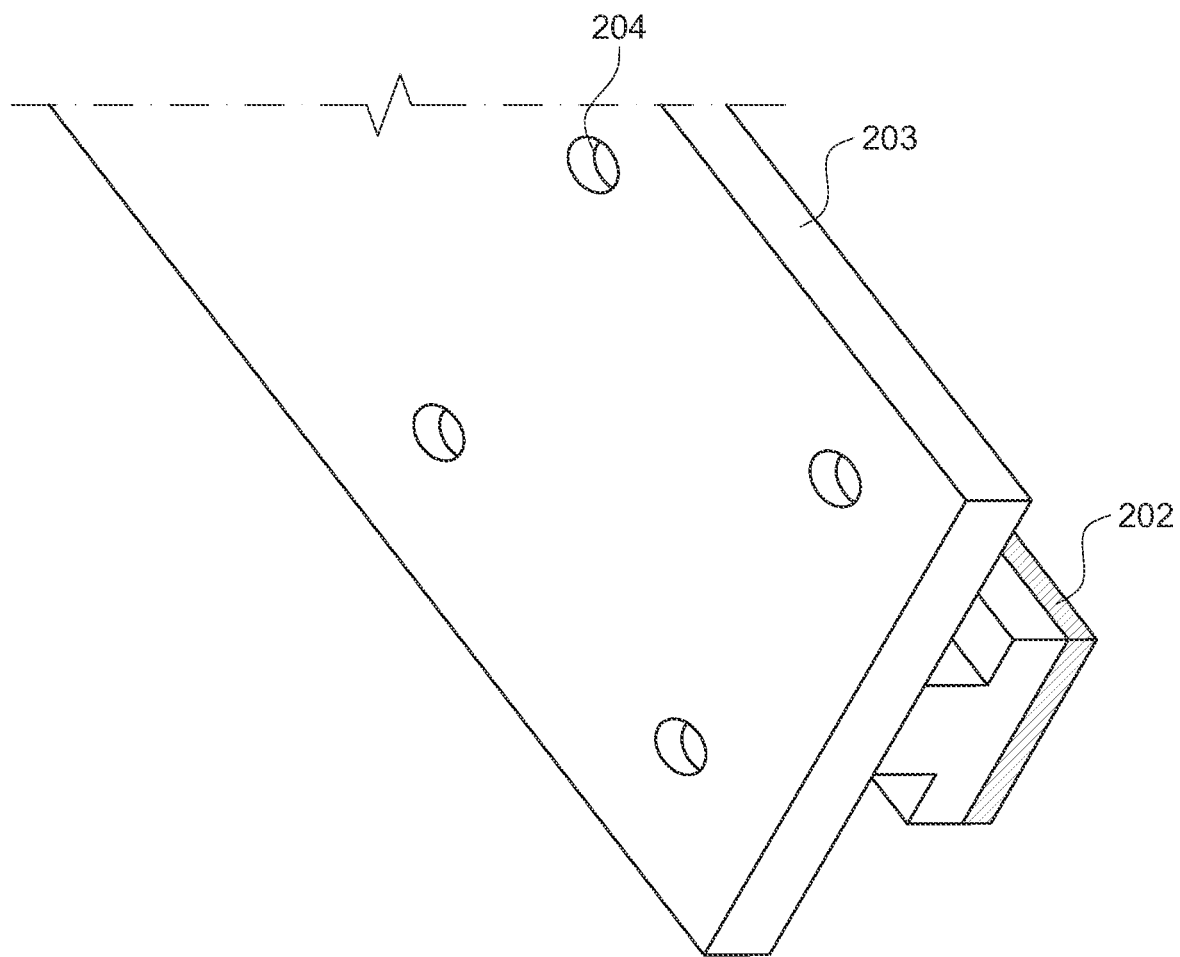
FIG. 2 shows another embodiment of a storage box connector of the disclosure.

FIG. 2 shows another embodiment of a storage box connector 203 of the disclosure. In FIG. 2, storage box connector includes holes 204, which may be tapped or otherwise configured for connecting a storage box to the storage box connector 203. Storage box connector 203 also includes a polymer-coating 202 along one or more surfaces of a bottom section to enable the storage box connector 203 to slide along a rail.

Figure 3:
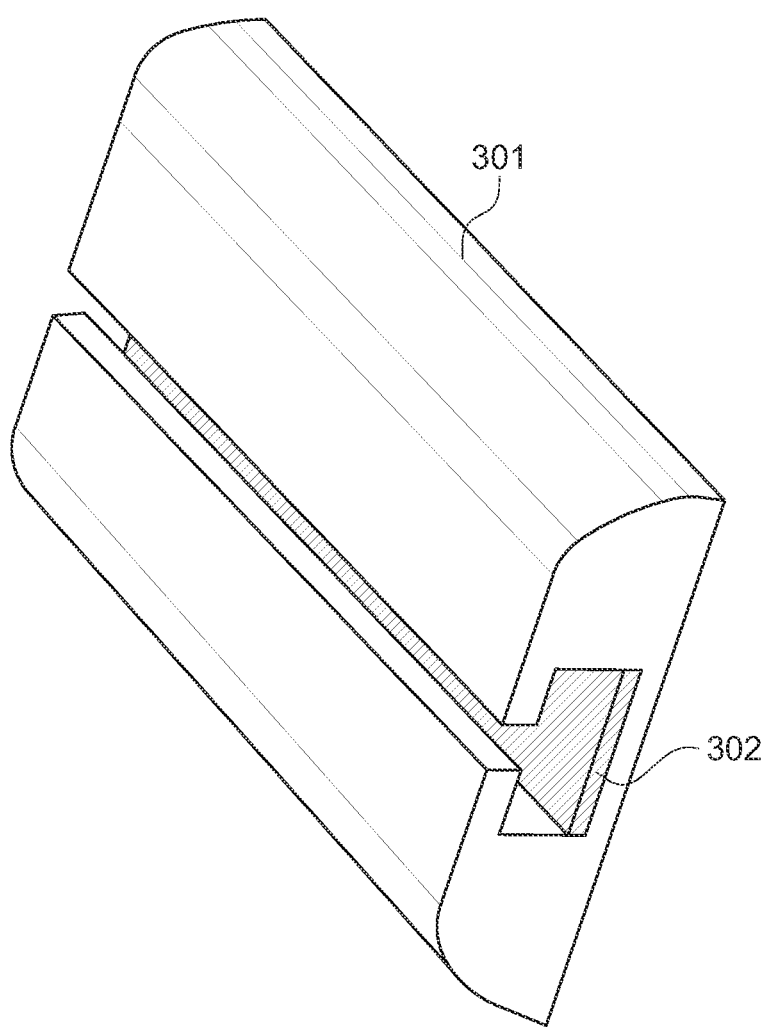
FIG. 3 shows another embodiment of a rail of the disclosure.

FIG. 3 shows another embodiment of a rail 301 of the disclosure. Storage box connector 301 includes a polymer-coating 302 to enable a storage box connector (not shown) to slide along the rail.

Figure 4:
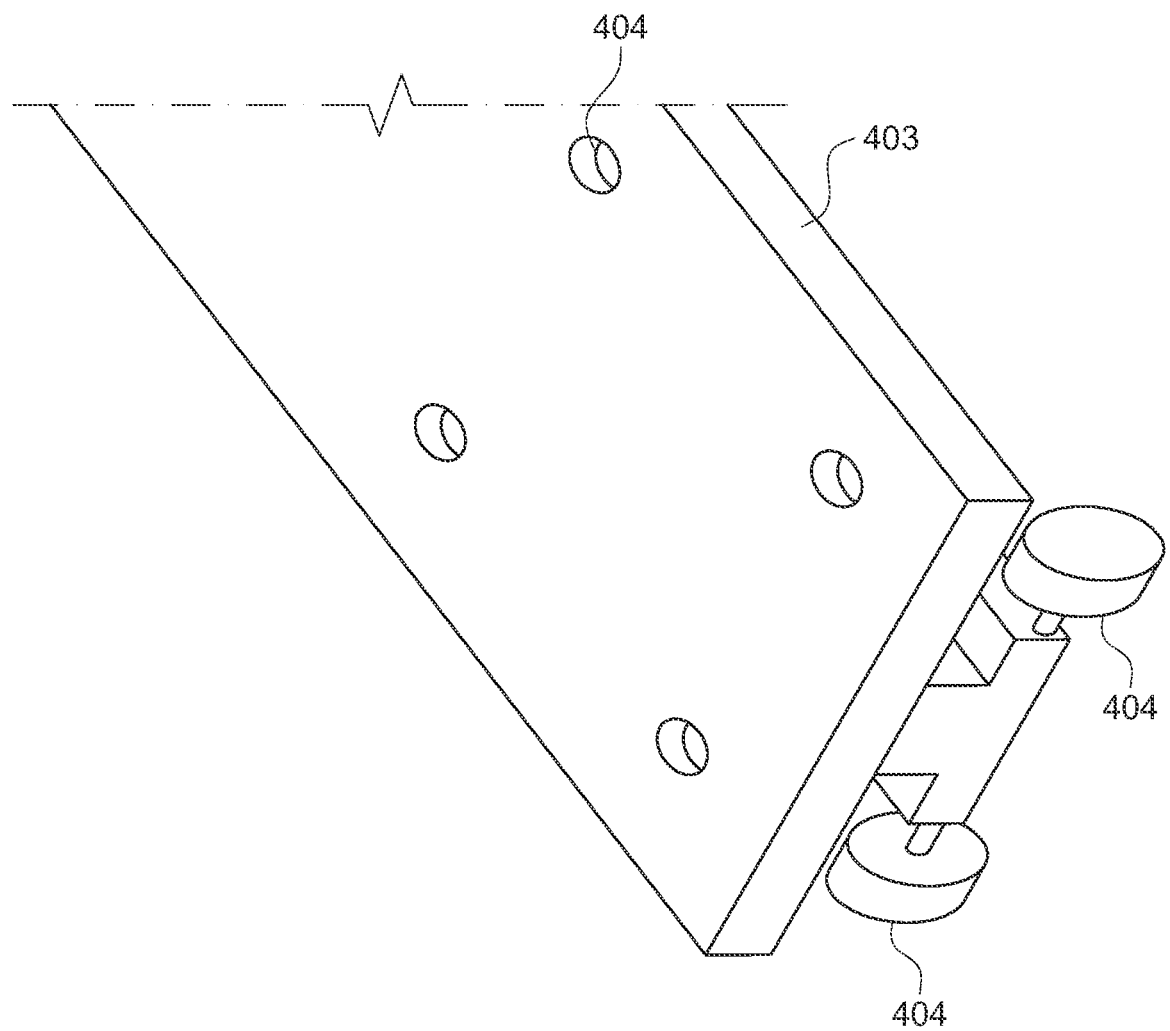
FIG. 4 shows another embodiment of a storage box connector of the disclosure.

FIG. 4 shows another embodiment of a storage box connector 403 of the disclosure. In FIG. 4, storage box connector 403 includes holes or fittings 404, which may or may not be tapped, to connect a storage box (not shown). In this embodiment, storage box connector 403 includes wheels 404 for transport along a rail.

Figure 5:
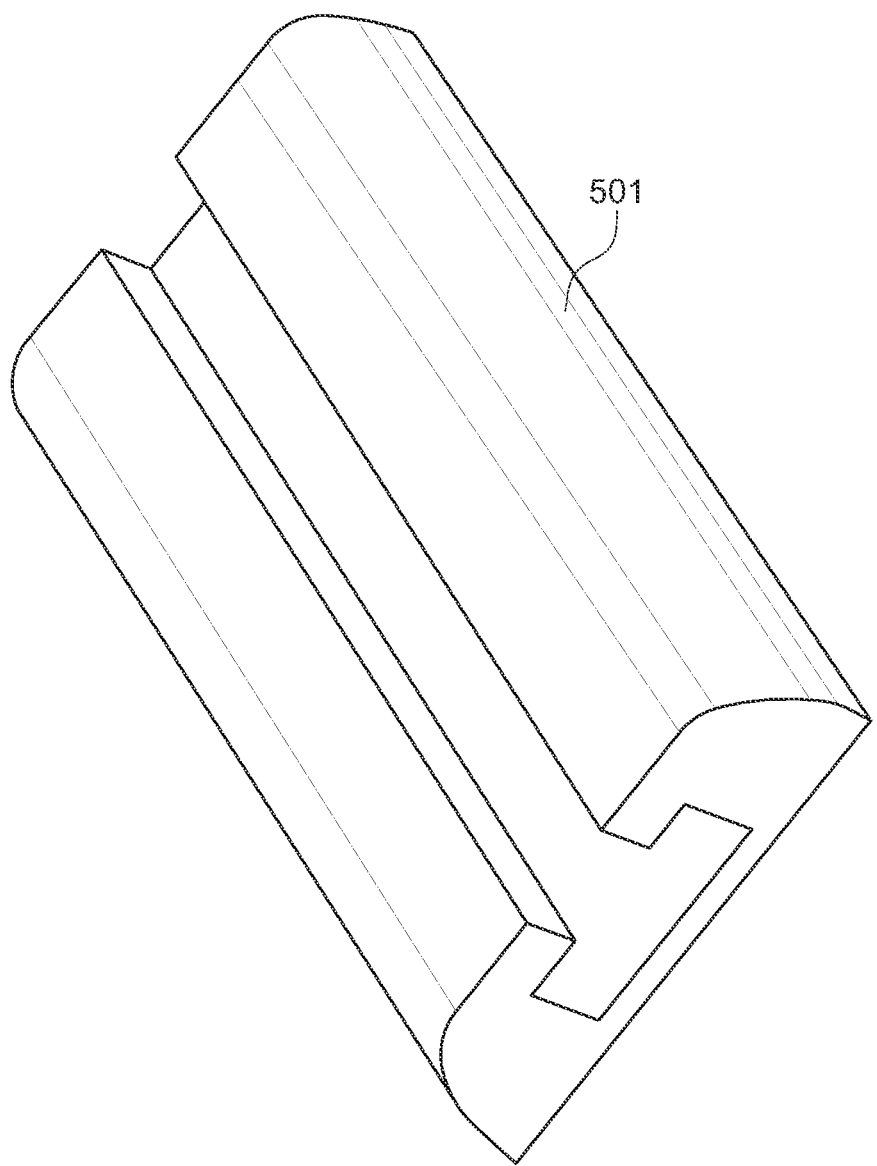
FIG. 5 shows another embodiment of a rail of the disclosure.

FIG. 5 shows another embodiment of a rail 501 of the disclosure. Rail 501, in this embodiment, is configured to accommodate a storage box connector that includes wheels for transport along the rail 501.

Figure 6:
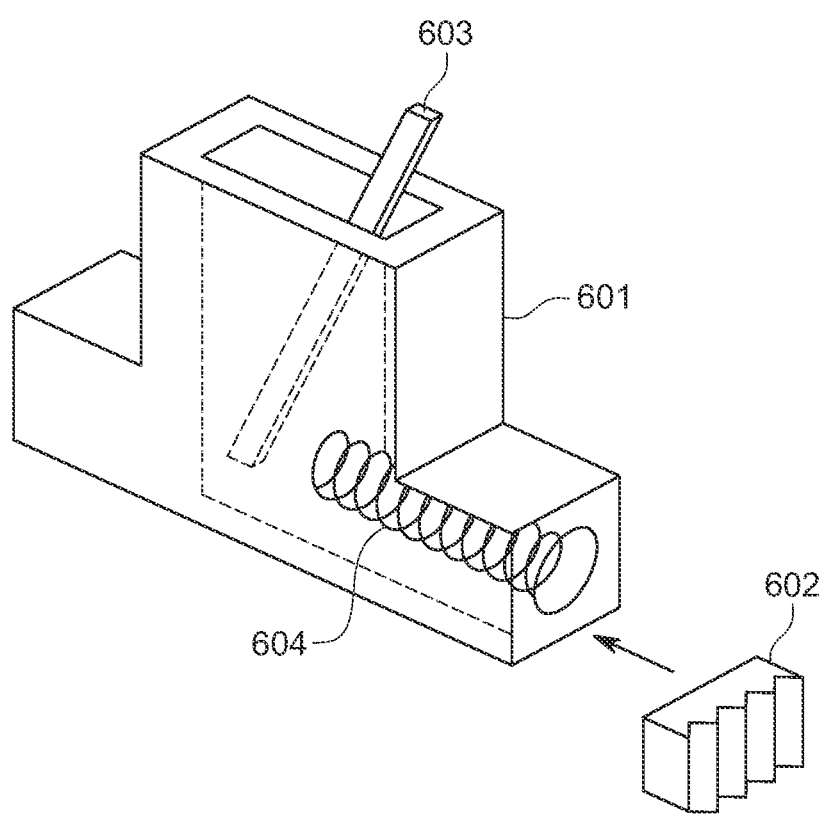
FIG. 6 shows an embodiment of a locking mechanism of the disclosure.

FIG. 6 shows an embodiment of a locking mechanism 601 of the disclosure. In FIG. 6, locking mechanism 601 includes lever 603, Spring 604, and gear plate 602.

Figure 7A:
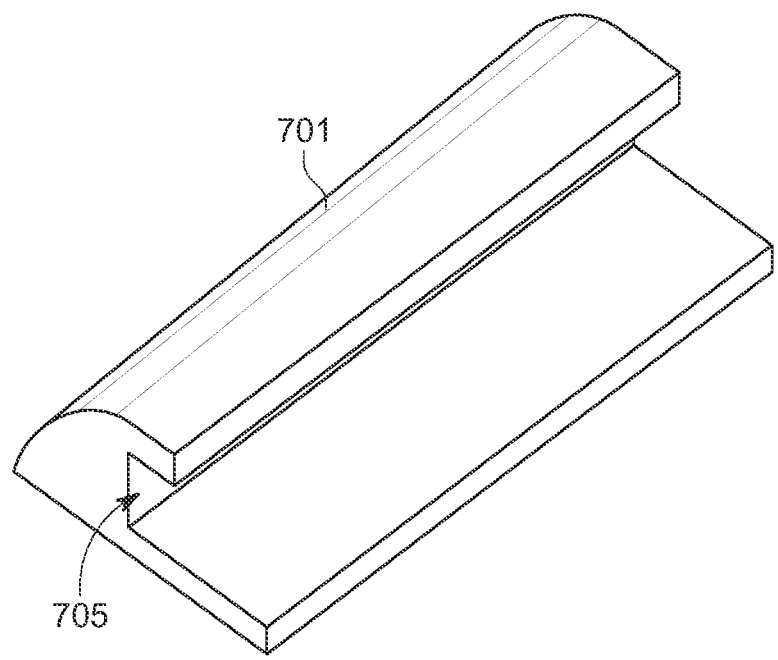
FIG. 7A shows a cut out view of a rail of the disclosure.

FIG. 7A shows a cut out view of a rail 701 of the disclosure. In FIG. 7A rail side section 705 is configured to hold a gear plate which may be used in conjunction with a locking mechanism.

Figure 7B:
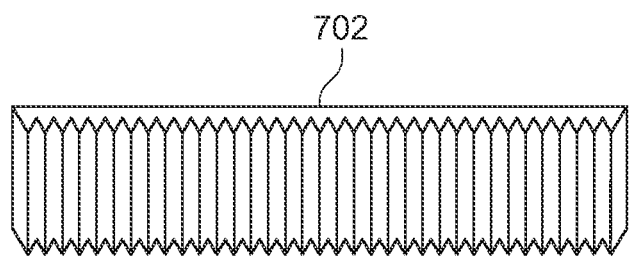
FIG. 7B shows a gear plate of the disclosure.

FIG. 7B shows a side view of a gear plate 702 that can be attached to a rail section and which may be used in conjunction with a locking mechanism to lock a storage box connector and storage box in place at a position along the rails(s).

Figure 7C:
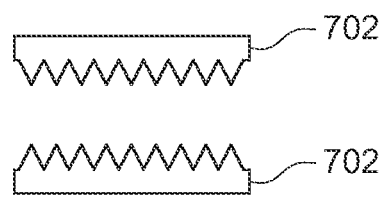
FIG. 7C shows a top-down view of gear plates of the disclosure.

FIG. 7C shows a top-down view of gear plates 702 that can attach, for example, to opposing rail side sections to fix a storage box connector and storage box in place with a locking mechanism.

Figure 8:
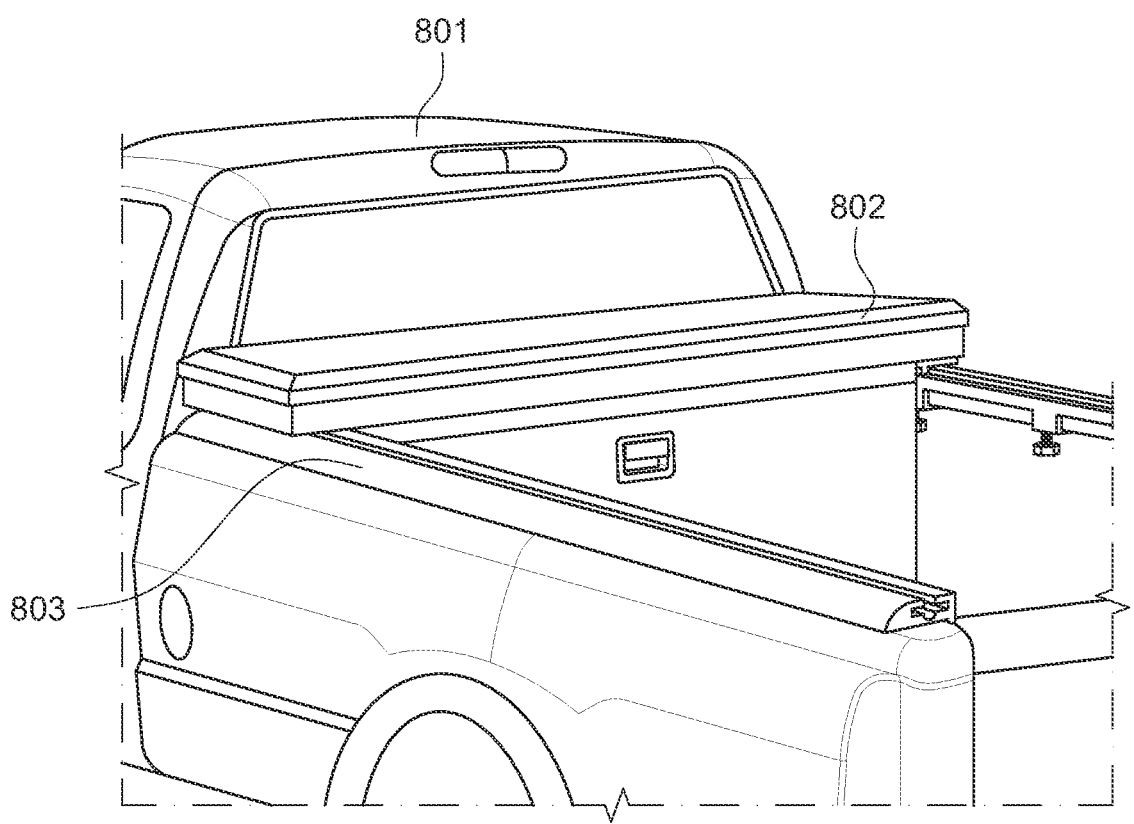
FIG. 8 shows an embodiment of a pickup truck, storage box, and rail system of the disclosure.

FIG. 8 shows an embodiment of a pickup truck 801, storage box 802, and rail system 803 of the disclosure.

While this disclosure includes specific examples, it will be apparent after an understanding of the disclosure of this application has been attained that various changes in form and details may be made in these examples without departing from the spirit and scope of the claims and their equivalents.

I claim:

1. A storage box and transport system for a vehicle bed, comprising:

a storage box;

one or more rails disposed in the bed, wherein the storage box is connected to the one or more rails; and a mechanism for transporting the storage box along the one or more rails;

a storage box connector on one side to the storage box and on another side to the one or more rails;

a locking mechanism for locking the storage box at a position along the one or more rails;

a gear plate attached to the storage box; and a gear plate attached to a rail;

wherein the locking mechanism reversible moves the gear plate attached to the storage box to be in contact with the gear plate attached to the rail.

2. The storage box and transport system for a vehicle bed of claim 1, wherein the mechanism for transporting the storage box along the one or more rails is manually powered.

3. The storage box and transport system for a vehicle bed of claim 2, wherein the one or more rails and the mechanism for transporting the storage box along the one or more rails comprise one or more surfaces comprising a polymer-coated surface.

4. The storage box and transport system for a vehicle bed of claim 3, wherein the polymer-coated surface comprises Polytetrafluoroethylene.

5. The storage box and transport system for a vehicle bed of claim 1, wherein the mechanism for transporting the storage box along the one or more rails comprises one or more attached wheels.

6. The storage box and transport system for a vehicle bed of claim 1, wherein the vehicle bed is a pickup truck bed.

7. The storage box and transport system for a vehicle bed of claim 6, wherein the rails extend from a cab to a tailgate of the pickup truck bed.

8. The storage box and transport system for a vehicle bed of claim 1, wherein the mechanism for transporting the storage box along the one or more rails is motorized.

9. The storage box and transport system for a vehicle bed of claim 8, wherein the motorized mechanism for transporting the storage box along the one or more rails comprises a chain, a belt drive, an electric motor, a battery-operated motor, or a combination of the above.

10. The storage box and transport system for a vehicle bed of claim 1, wherein the number of rails is two.

\* \* \* \* \*